(Model.)

J. C. MELCHER.
INSECT DESTROYER.

No. 288,833. Patented Nov. 20, 1883.

Witnesses:

Inventor:
J. C. Melcher,
per F. A. Lehmann, atty

UNITED STATES PATENT OFFICE.

JOHN C. MELCHER, OF O'QUINN, TEXAS.

INSECT-DESTROYER.

SPECIFICATION forming part of Letters Patent No. 288,833, dated November 20, 1883.

Application filed August 31, 1883. (Model.)

*To all whom it may concern:*

Be it known that I, J. C. MELCHER, of O'Quinn, in the county of Fayette and State of Texas, have invented certain new and useful Improvements in Insect and Animal Destroyers; and I do hereby declare the following to be a full, clear, and exact description of the invention, such as will enable others skilled in the art to which it pertains to make and use it, reference being had to the accompanying drawings, which form part of this specification.

My invention relates to an improvement in insect and animal destroyers; and it consists in the combination of a suitable fire-chamber provided with a cover at its top, a pipe which passes through its side to admit a blast of air, a removable bottom, which is supported inside of the bottom of the chamber upon suitable supports, and a removable pipe through which the products of combustion are forced, as will be more fully described hereinafter.

The object of my invention is to provide insect and animal destroyers with a removable bottom and pipe through which the products of combustion pass, so that when these parts are destroyed they have only to be replaced by new ones.

This invention is intended especially as an improvement upon the patents heretofore granted to me for similar devices, in which the parts are rigidly secured together.

Figure 1:
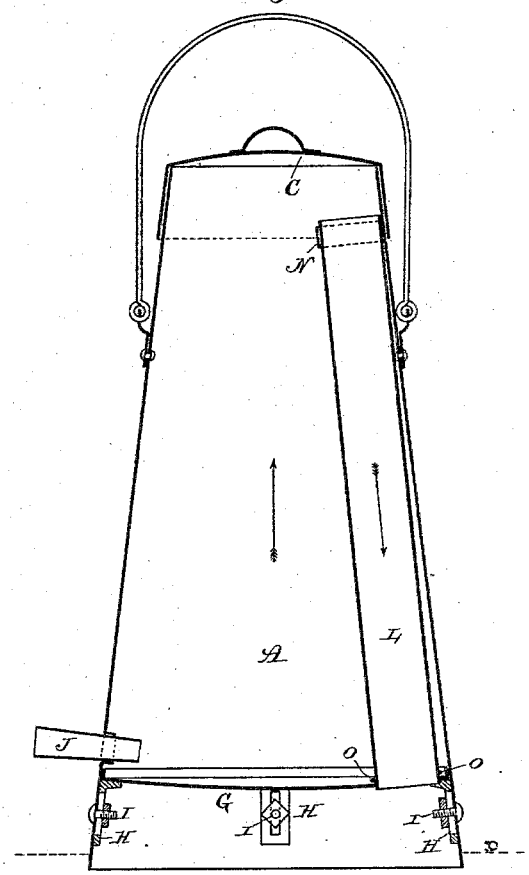
Figure 2:
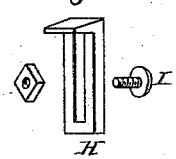

Figure 1 is a vertical section of a device embodying my invention. Fig. 2 is a detached view of the slotted part which supports the bottom in position.

A represents the fire-chamber, which will preferably be of the form here shown, and which has its lower edge sharpened sufficiently to enter the ground a slight distance around the hole of the insects or animals, and thus form a tight joint with the ground and prevent the fumes and smoke from escaping under the edges of the fire-chamber. The upper part of this fire-chamber is open, so that a fire can be readily made therein, and this open end is covered by a tightly-fitting cover, C, which is placed on after the fire has been made, so as to prevent any of the fumes of the smoke from escaping at this point. Also secured to the upper end of this fire-chamber is a bail or handle, by means of which it can be readily carried around.

As sulphur is always one of the compounds used in producing the poisonous vapor for destroying the animal and insect life, this bottom and outlet-pipe are quickly destroyed, and then the fire-chamber and the parts attached thereto are thrown away as utterly useless. In order to prevent this waste of the fire-chamber itself, the bottom G of the chamber is here made concave and supported upon adjustable slotted supports H. The fire-chamber is first inverted and then the bottom dropped down in position as far as it will go. The slotted supports are then applied to the inner sides of the fire-chamber and forced upward until their ends bear against the under side of the bottom. These supports are then secured rigidly in position by suitable clamping bolts or devices, I, which are passed through the sides of the fire-chamber, as shown. Also secured to the side of the fire-chamber, just above the bottom, is a suitable inlet-pipe, J, through which a blast of air is forced for the purpose of increasing combustion.

Passing down through one side of the bottom of the fire-chamber is the removable pipe L, which is held in place by a suitable band or loop, N, at its upper end, and by a flange or shoulder, O, which is made around its lower one, and which flange or shoulder bears against the upper side of the bottom. This pipe is made removable, so that when it becomes injured or destroyed by heat or the poisonous compounds which are used it can be readily replaced by another.

Having thus described my invention, I claim—

The combination, in an insect and animal destroyer, of the fire-chamber A, provided with the cover C, the removable bottom G, the slotted supports H, the clamping-bolts I, and the removable pieces J L, the pipe L being provided with the collar or flange O at its lower end, substantially as shown and described.

In testimony whereof I affix my signature in presence of two witnesses.

JOHN C. MELCHER.

Witnesses:
JOHN ROHDEN,
C. F. W. TREPTOW.